May 22, 1962   M. VANZO ET AL   3,035,629
TIRE BUILDING APPARATUS AND METHOD
Filed Dec. 9, 1957   4 Sheets-Sheet 2

May 22, 1962  M. VANZO ETAL  3,035,629
TIRE BUILDING APPARATUS AND METHOD
Filed Dec. 9, 1957  4 Sheets-Sheet 3

United States Patent Office 3,035,629
Patented May 22, 1962

3,035,629
TIRE BUILDING APPARATUS AND METHOD
Marcello Vanzo, Dario Giletta, and Antonio Pacciarini, Milan, Italy, assignors to Pirelli Societa per Azioni, Milan, Italy
Filed Dec. 9, 1957, Ser. No. 701,431
Claims priority, application Italy Dec. 14, 1956
8 Claims. (Cl. 156—403)

This invention refers to a tire building apparatus of the type comprising a building drum including two axially spaced circular rigid discs which can be axially drawn together and apart, a tubular resilient diaphragm having its opposite end edges air-tightly fitted over circumferential portions of the discs whereby the drum can be inflated thereby to deform the membrane to a toroidal shape while the discs are drawn towards each other. Such an apparatus is more particularly described in the United States Patent No. 2,814,330 issued on November 26, 1957, to Vanzo et al. and entitled Machine for Building Pneumatic Tires.

This invention is concerned therefore with an improvement in the building drum of the character mentioned above, mainly consisting of expansible annular seatings carried by the respective disc, the seatings being capable of receiving the bead wires and associated portion of fabric involved in the tire structure. On expansion, the seatings engage the said portions and press them radially outwards against the bead wires thereby fixing the wires and fabric in a firmly interengaged condition on the discs preparatory to and during the succeeding steps of the manufacturing process of the tire.

The annular seatings preferably provide a circumferential groove of variable effective diameter, whereby, on expansion of the seatings, the end sections of the fabric freely protruding beyond the bead wires will be spread to a funnel shape, that is to a shape which greatly facilitates the subsequent upturning of the said end sections around the bead wires and folding them over a central body of the fabric confined between the bead wires. According to a further feature of this invention the upturning step is carried out after the body of the fabric has been deformed to a toric shape, whereby wrinkling of the said end sections is surely avoided.

It will be readily realised that, when provided with expansible seatings, the discs themselves may present their outer diameter smaller than the inner diameter of the beads of the tire. The tire built on the drum can therefore be readily removed from the drum without deforming the beads, and this is an important advantage of this invention, especially when the bead wires are relatively stiff and non-deformable.

Further features and advantages of this invention will be readily apparent from the appended description referring to the accompanying drawing wherein.

Figure 1:
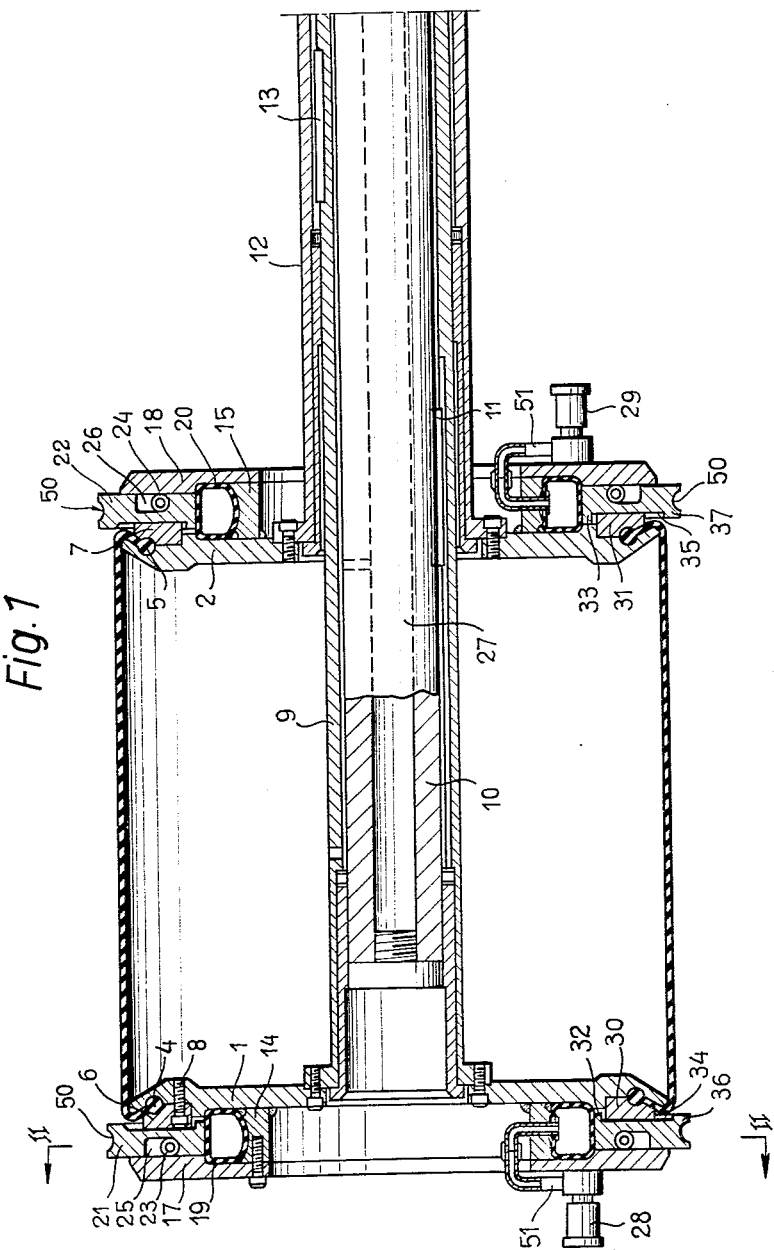
FIGURE 1 is a longitudinal sectional view of a building drum according to this invention.
Figure 2:
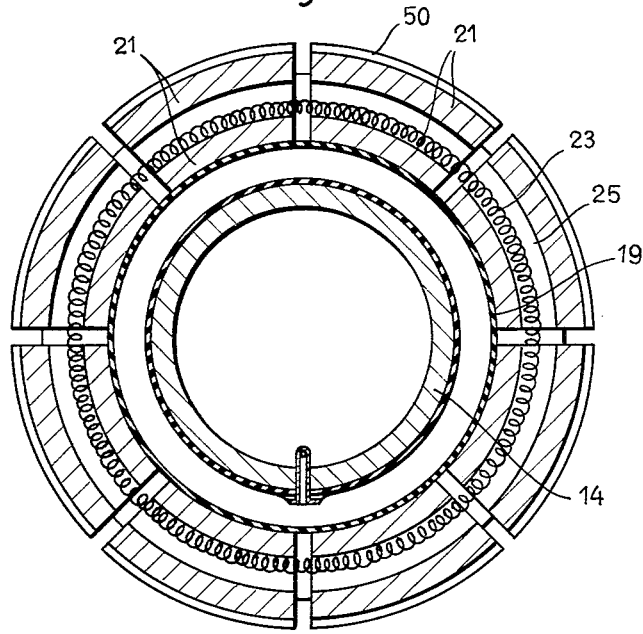
FIGURE 2 is a cross-sectional view on line II—II of FIGURE 1.

The building drum shown in FIGURES 1 and 2 comprises two metal discs 1 and 2 between which a resilient tubular rubber diaphragm 3 is stretched, the enlarged edges 4, 5 of which are clamped air-tight between the metal discs 1 and 2 and metal rings 6 and 7, respectively, by means of screws 8.

The disc 1 is rigidly connected to a tubular mandrel 9 which is telescopically slidable on the shaft 10 but is kept against rotation with respect to the latter through the key 11. The disc 2 is rigidly connected to the tubular mandrel 12 which is telescopically slidable on the mandrel 9, but is kept against rotation with respect thereto through a key 13. Consequently, the discs 1 and 2 can be drawn axially together and apart but are restrained from rotation relative to each other and to the shaft 10. Collars 14 and 15 are securedly fixed to the outer faces of the discs 1 and 2 respectively and have secured thereto by means of a plurality of screws 16, metal rings 17 and 18, respectively, which confine together with the discs 1 and 2 two annular channels respectively receiving inflatable annular air-hoses 19 and 20, two circular sets of rigid sectors 21, 22, the innermost portion of which is capable of being radially supported from its respective air-hose, and annular helical springs 23, 24 accommodated in the circular grooves 25, 26 machined in the sectors 21, 22. The circumferential portion of the said sectors is so shaped as to form a circumferential channel 50 semi-circular in cross section, which may be advantageously enlarged outwardly or slightly asymmetrical, smoothly merging towards the diaphragm 3. Such a profile is shown in FIGURE 3, wherein the channel 50 is confined between two shoulders 50a and 50b, the radial height of the shoulder 50a being smaller than the radial height of the shoulder 50b and the shoulder 50a being moreover bevelled as shown and smoothly merging into the channel 50.

An axial conduit 27 is bored in the shaft 10 to selectively connect the space between the discs 1, 2 and diaphragm 3 with a source of compressed air through a suitable pressure adjusting means, and with a source of vacuum. For inflating the air hoses 19, 20 nipples 28, 29 are provided connecting with the hoses through short tubes 51. The radial expansion of the sectors 21, 22 on inflation of the air hoses 19, 20 is limited by annular abutments 30, 31 on the rings 6, 7 abutted by the projections 32, 33 on the sectors. The radially inward stroke of the sectors, which is promoted by the action of the springs 23, 24 on deflation of the air hoses 19, 20 is limited by annular abutments 34, 35 abutted by projections 36, 37 on the sectors.

Figure 4:
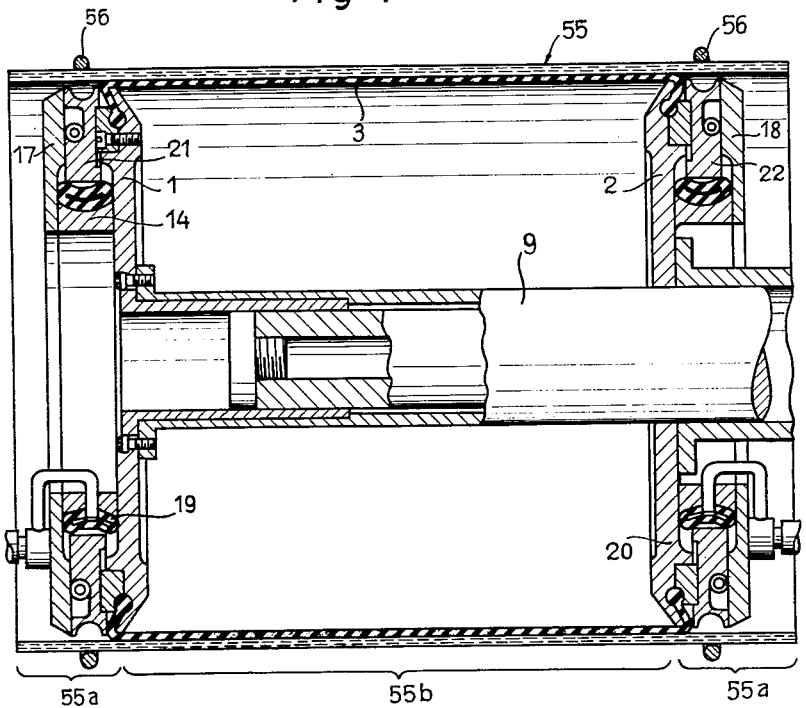
FIGURES 4 through 8 are illustrative of the process of this invention making use of a building drum as shown in FIGURES 1 and 2.

As may be seen in FIGURE 1, in a fully inflated condition of the hoses 19, 20 the effective diameter of the seatings 50 is greater than the outer diameter of the diaphragm 3 when in straightly cylindrical configuration. On the contrary, as may be more clearly seen in FIGURE 4, showing the sectors 21, 22 in a fully reentered condition, the minimum effective diameter of the seatings 50 is smaller than the said outer diameter of the diaphragm 3.

Figure 3:
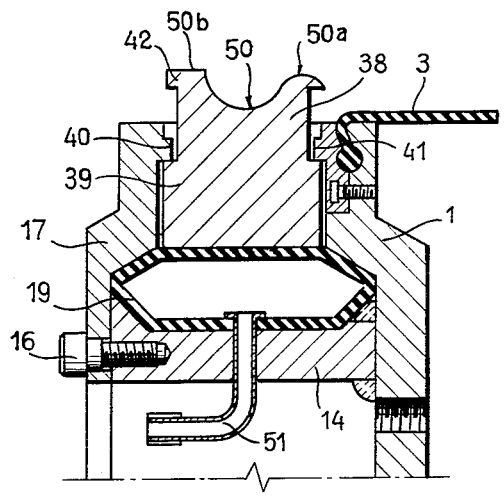
FIGURE 3 is a part cross-sectional view of a modified construction of the seatings for the beads which can be used in a building drum shown in FIGURE 1.

FIGURE 3 shows a modification in which the set of rigid sectors is replaced by a ring 38 of a resilient material capable of being forced outwardly by the inflatable annular air hose 19. In order to limit the expansion stroke of the ring 38, the ring is formed at its opposite faces with annular ridges 39 radially abutting the annular ridges 40, 41 protruding from the disc 1. An annular ridge 42 is provided for limiting the spontaneous contraction of the ring 38 due to the elasticity of the ring material on deflation of the air hose 19, said ridge 42 abutting the radially outer circumferential face of the ridge 40. It is understood that both discs 1 and 2 of FIGURE 1 can be modified as shown in FIGURE 3, all other parts remaining unaltered, and that any further detailed illustration of such an arrangement seems therefore to be superfluous.

In order to draw together and away the discs 1, 2 and rotate them about their axis the arrangement disclosed in U.S. Patent No. 2,814,330 or any other equivalent arrangement can be adopted. In order to radially force outwardly the sectors 21, 22 means other than described can be adopted without departing from the scope of this invention, it being understood that the main feature of the drum resides in the combination of two rigid circular elements, which are capable of relative axial displacement and are interconnected by a resilient diaphragm which is capable of taking a toric shape, with two seat forming rings, the effective diameter of which is variable at will, independently of the deformation of said resilient diaphragm.

With the above described drum pneumatic tires of various types can be manufactured by processes which though depending upon number and type of fabric plies and bead wires employed, are all based on the following basical steps.

The discs 1 and 2 are placed at the greatest distance apart, the conduit 27 is connected to the source of compressed air in order to keep the diaphragm 3 constantly stretched by means of a slight air-pressure so that the membrane 3 is cylindrical.

The fabric plies 55 and bead wires 56 (FIG. 4) are then positioned on the drum providing two overhanging end zones 55a of the fabric 55 which protrude beyond the ends of the diaphragm 3 as shown in FIGURE 4.

Figure 5:
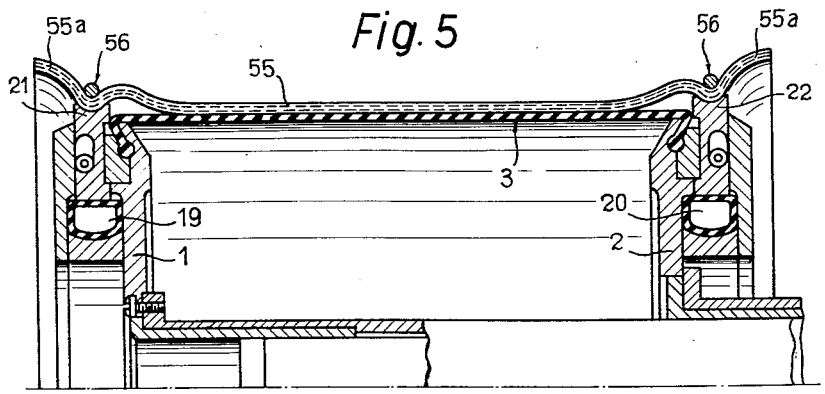

The bead wires 56 are brought into register with the seatings 50 on the sectors 21, 22, whereby each of the bead wires embraces its associated overhanging end zone 55a in a position relatively close to the supported body portion 55b of the fabric. Compressed air is then delivered into the air hoses 19, 20 to force the sectors 21, 22 radially outward, whereby the seats 50 in the sectors press the fabric against the bead wires thereby fixing the latter in their assembly condition, in which the outer diameter of the sectors 21, 22 is greater than the inner diameter of the rings 17, 18 and the diaphragm 3, substantially as shown in FIGURE 5.

Figure 6:
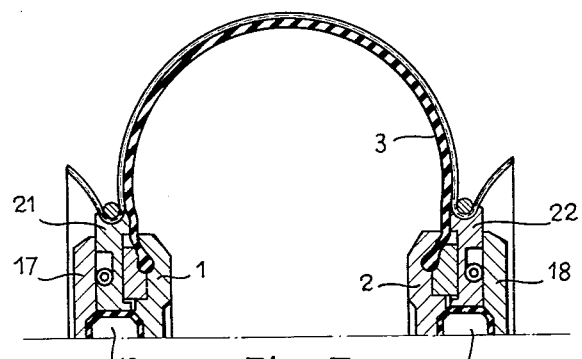

The fabric thus adheres to the bead wires, and the zones 55a of the fabric plies are thus simultaneously drawn apart or expanded spontaneously away from the rotational axis of the drum and are held in this position. When laying of the fabric and bead wires is completed, the discs 1 and 2 are gradually drawn together as the pressure within the drum is gradually increased, so that the diaphragm and superposed fabric take and maintain a toric shape and fully adhere to one another, as is shown in FIGURE 6.

Figure 7:
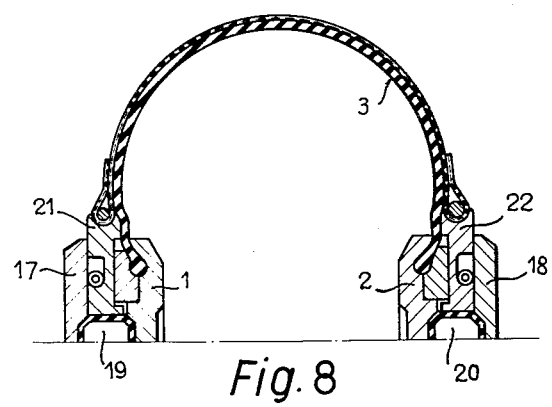

The fabric zones 55a which are in open condition are now caused to adhere to the outer surface of the supported body 55b of the fabric in order to wrap the bead wires by a sort of loop. During this step, which is preferably carried out by means of a rolling device, the zones 55a of the fabric go over from a position shown in FIGURES 5 and 6 to a location larger in diameter (FIGURE 7) since the body portion of the fabric is already shaped, whereby wrinkles are fully avoided. The rubber tread and sides are then positioned and stitched on the fabric.

Figure 8:
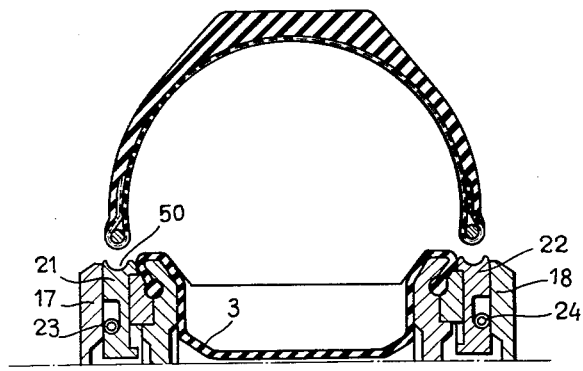

In order to remove the formed tire from the drum, the conduit 27 is connected with a source of vacuum and the air hoses 19 and 20 are deflated, so that the springs 23, 24, which had been stretched on expansion of the sectors, return the sectors to their inoperative position setting free the tire beads (FIGURE 8).

It will be clearly understood from the above that, on deflating the diaphragm 3, the assembled tire may be removed from the drum in a very easy manner, even when the beads are stiff and undeformable, inasmuch as the outer maximum diameter of the drum when in inoperative condition is smaller than the inner diameter of the beads. Moreover, the lengthy and serious manual step of drawing the fabric edges apart, which cannot be carried out simultaneously throughout the circumference, or the use of special opening devices and shaped rollers for turning over the fabric edges are dispensed with, whereby the structure of the building machine is considerably simplified.

Through the shape of the seatings for the beads, the fabric end zones 55a are not only automatically opened on increase of diameter of the said seatings, but are held in their open condition even if the drum be stationary or rotate at a lower speed than would be necessary for maintaining the said zones open by the action of the centrifugal force deriving from rotation of the drum.

Finally, the invention affords a considerable economy in time and work by dispensing from all additional steps required for shaping in a separate device.

What we claim is:

1. In a rotatable tire building drum a pair of axially, aligned rigid circular discs axially adjustable with respect to each other, a tubular resilient diaphragm having its opposite end edges air-tightly connected to circumferential portions of the discs, means for delivering air pressure into the space confined between the discs and diaphragm whereby the drum may be inflated thereby to deform the diaphragm to a toric shape when the discs are drawn towards each other, a radially expansible circumferential groove-shaped seating on each disc capable of receiving a bead portion of a tire during its manufacture, the said seating having a minimum effective diameter which is smaller than the outer diameter of the tubular diaphragm in inoperative condition of the drum, and a maximum effective diameter which is greater than the said outer diameter of the tubular diaphragm, and means radially supporting the seatings from the discs capable of varying at will the effective diameter of the seatings within its maximum and minimum values.

2. In a rotatable tire building drum a pair of axially aligned rigid circular discs axially adjustable with respect to each other, a tubular resilient diaphragm having its opposite end edges air-tightly connected to circumferential portions of the discs, means for delivering air pressure into the space confined between the discs and diaphragm whereby the drum may be inflated thereby to deform the diaphragm to a toric shape when the discs are drawn toward each other, a radially expansible circumferential groove-shaped seating on each disc capable of receiving a bead portion of a tire during its manufacture, the said seating having a minimum effective diameter which is smaller than the outer diameter of the tubular diaphragm in inoperative condition of the drum, and a maximum effective diameter which is greater than the said outer diameter of the tubular diaphragm, and an inflatable annular means radially supporting the seatings from the discs whereby the effective diameter of the seatings can be varied at will within its maximum and minimum values of inflating the inflatable annular means.

3. In a rotatable tire building drum a pair of axially aligned rigid circular discs axially adjustable with respect to each other, a tubular resilient diaphragm having its opposite end edges air-tightly connected to circumferential portions of the discs, means for delivering air pressure into the space confined between the discs and diaphragm whereby the drum may be inflated thereby to deform the diaphragm to a toric shape when the discs are drawn towards each other, a radially expansible circumferential groove-shaped seating on each disc capable of receiving a bead portion of a tire during its manufacture, the said seating having a minimum effective diameter which is smaller than the outer diameter of the tubular membrane in inoperative condition of the drum, and a maximum effective diameter which is greater than the said outer diameter of the tubular membrane, a radially effective abutment on each disc defining the maximum effective diameter of the associated seating, and means radially supporting the seatings from the discs capable of varying at will the effective diameter of the seatings within its maximum and minimum values.

4. In a rotatable tire building drum a pair of axially aligned rigid circular discs axially adjustable with respect to each other, a tubular resilient diaphragm having its opposite end edges air-tightly connected to circumferential portions of the discs, means for delivering air pressure into the space confined between the discs and diaphragm whereby the drum may be inflated thereby to deform the diaphragm to a toric shape when the discs are drawn towards each other, a radially expansible circumferential groove-shaped seating on each disc capable of receiving a bead portion of a tire during its manufacture, the said seating having a minimum effective diameter which is smaller than the outer diameter of the tubular diaphragm in inoperative condition of the drum, and a maximum effective diameter which is greater than the said outer diameter of the tubular diaphragm, a radially effective abutment on each disc defining the maximum effective diameter of the associated seating, means associated with the seatings urging the seatings towards the minimum effective diameter, and means radially supporting the seatings from the discs capable of varying at will the effective diameter of the seatings within its maximum and minimum values.

5. In a rotatable tire building drum a pair of axially aligned rigid circular discs axially adjustable with respect to each other, a tubular resilient diaphragm having its opposite end edges air-tightly connected to circumferential portions of the discs, means for delivering air pressure into the space confined between the discs and diaphragm whereby the drum may be inflated thereby to deform the diaphragm to a toric shape when the discs are drawn towards each other, a radially expansible circumferential groove-shaped seating on each disc capable of receiving a bead portion of a tire during its manufacture, the said seating having a minimum effective diameter which is smaller than the outer diameter of the tubular diaphragm in inoperative condition of the drum, and a maximum effective diameter which is greater than the said outer diameter of the tubular diaphragm, the said seatings comprising each a circular series of sectors slidably supported from the associated disc in a radial direction, means for radially supporting and expanding the sectors from the associated disc whereby the effective diameter of the seatings can be varied, and means urging the sectors towards the minimum effective diameter of the seatings.

6. In a rotatable tire building drum a pair of axially aligned rigid circular discs axially adjustable with respect to each other, a tubular resilient diaphragm having its opposite end edges air-tightly connected to circumferential portions of the discs, means for delivering air pressure into the space confined between the discs and diaphragm whereby the drum may be inflated thereby to deform the diaphragm to a toric shape when the discs are drawn towards each other, a radially expansible circumferential groove-shaped seating on each disc capable of receiving a bead portion of a tire during its manufacture, the said seating having a minimum effective diameter which is smaller than the outer diameter of the tubular diaphragm in inoperative condition of the drum, and a maximum effective diameter which is greater than the said outer diameter of the tubular diaphragm, the said seatings consisting each of a channeled ring of a resilient material capable of being radially expanded, means for radially supporting and expanding the ring from the associated disc whereby the effective diameter of the seatings can be varied, and a radially effective means on each disc defining the maximum effective diameter of the seatings.

7. In a tire building drum as claimed in claim 1, the said groove-shaped seating having asymmetrical cross-sectional profile comprising a pair of shoulders, the shoulder adjacent the diaphragm having a radial height smaller than the other shoulder.

8. In a rotatable tire building drum a pair of axially aligned rigid circular discs axially adjustable with respect to each other, a tubular resilient diaphragm having its opposite end edges air-tightly connected to circumferential portions of the discs, means for expanding said diaphragm outwardly whereby the diaphragm is deformed to a toric shape when the discs are moved towards each other, a radially expansible circumferential groove-shaped seating on each disc capable of receiving a bead portion of a tire during its manufacture, and means within each disc radially supporting each seating and being capable of varying the effective diameter of said seating.

References Cited in the file of this patent

UNITED STATES PATENTS

| | | |
|---|---|---|
| 1,551,040 | Marquette | Aug. 25, 1925 |
| 2,653,645 | Frazier | Sept. 29, 1953 |
| 2,814,330 | Vanzo et al. | Nov. 26, 1957 |

FOREIGN PATENTS

| | | |
|---|---|---|
| 463,422 | Canada | Feb. 28, 1950 |
| 856,513 | Germany | Nov. 20, 1952 |